Aug. 23, 1932.  J. A. WAGNER  1,873,687
WEAR REDUCING KEY FOR BRAKE HEADS
Filed June 26, 1931
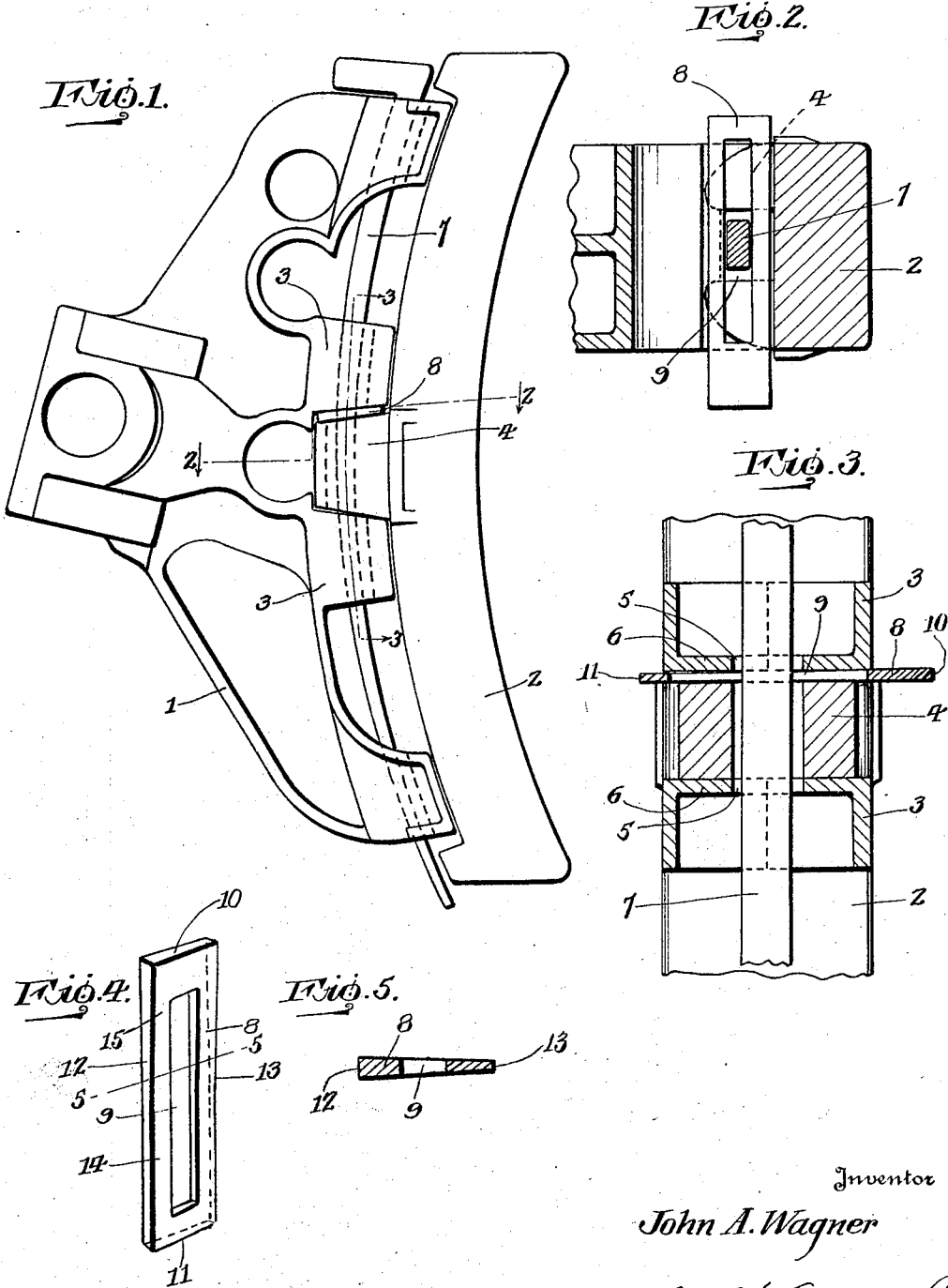
Inventor
John A. Wagner
By
Geo. P. Kimmel
Attorney Patented Aug. 23, 1932

1,873,687

UNITED STATES PATENT OFFICE

JOHN A. WAGNER, OF DECATUR, ILLINOIS, ASSIGNOR, BY MESNE ASSIGNMENTS, TO TRANSERV CORPORATION, OF CHICAGO, ILLINOIS, A CORPORATION OF ILLINOIS

WEAR REDUCING KEY FOR BRAKE HEADS

Application filed June 26, 1931. Serial No. 547,124.

This invention relates to a wear reducing key for brake heads.

In the manufacture of brake heads and shoes for connection therewith, it is customary to allow a clearance between a lug on the shoe and a pair of lugs on the head between which pair of lugs the lug on the shoe projects, consequently the connection between the head and shoe is somewhat loose, resulting in a vibration in use which causes a rapid wearing away of the lugs on the head and ultimately renders the head useless.

The primary object of this invention is to provide, in a manner as hereinafter set forth, means for preventing excessive wear on brake heads at their points of connection with brake shoes, thereby increasing the normal effective lives of brake heads and consequently affording a material saving in replacement.

A further object of the invention is to provide a wear reducing means of the character aforesaid which may be utilized for taking up wear on the brake heads and shoes already in active use, thereby reducing the vibration between worn brake heads and shoes and prolonging the effective lives of the brake heads.

A further object of the invention is to provide a wear reducing means of the character aforesaid which may be wedged in position between a brake head and shoe, and which is coupled with the brake head in such a manner that the same cannot become lost.

With the foregoing and other objects in view, the invention consists of the novel construction, combination and arrangement of parts as hereinafter more particularly described, and as illustrated in the accompanying drawing, but it is to be understood that the description and drawing are to be considered as illustrative rather than limitative.

In the accompanying drawing wherein like numerals are employed to designate like parts throughout the several views:

Figure 1 is an elevation of a brake head and shoe with a wear reducing key in accordance with this invention applied thereto.

Figure 2 is a section taken on the line 2—2 of Figure 1.

Figure 3 is a section taken on the line 3—3 of Figure 1.

Figure 4 is a perspective of the wear reducing key.

Figure 5 is a section taken on the line 5—5 of Figure 4.

Referring to the drawing in detail, the numerals 1 and 2 respectively indicate a brake head and brake shoe, the head 1 being provided with a pair of spaced hollow lugs 3 between which a hollow lug 4 formed on the shoe 2 projects. The lug 4 is formed with open sides in registry with openings 5 in the inner side walls 6 of the lugs 3 for the reception therethrough of an arcuate brake pin 7 for securing the shoe to the head.

In the usual manufacture thereof, the head and shoe are roughly cast and a clearance of substantially $\tfrac{1}{16}$ of an inch is allowed between the lug 4 and each of the lugs 3. In use, this clearance causes considerable vibration whereby the inner faces of the lugs 3 are rapidly worn away, necessitating replacement of the brake head. In order to eliminate the vibration caused by this clearance, I provide a key 8 for insertion between the lug 4 and one of the lugs 3, the key preferably being of appropriate thickness to take up the clearance on both sides of the lug 4 whereby the latter is forced into snug contact with one of the lugs 3. Although all of the clearance preferably will be taken up at one side of the lug 4, if desired the key 8 may be of proper thickness to take up only one-half of the clearance, in which event a key 8 will be employed at each side of the lug 4. Intermediate the ends thereof, the key 8 is provided with an elongated slot 9 for the reception therethrough of the brake pin 7, the slot 9 being of materially greater length than the width of the key.

In order that the key may be readily positioned between the lug 4 and one of the lugs 3 to permit the insertion of the pin 7 through the slot 9, and the key then driven into wedging relationship to the lugs, the key is of materially greater thickness at one end 10 thereof than at the opposite end 11 thereof, and gradually decreases in thickness from the end 10 to a point substantially midway between the ends, from which point to the end 11 the key is of uniform thickness. In the usual construction of brake heads and shoes, the lugs 3 and 4 are tapered with the taper of the lug 4 having a greater pitch than that of the lugs 3. In order to compensate for this difference in pitch and engage the key snugly with both lugs between which it is positioned, the key gradually decreases in thickness transversely from one side edge 12 to the opposite side edge 13.

In the use of the key, the end portion 14 thereof which is of uniform thickness lengthwise of the key is inserted between the lug 4 and one of the lugs 3, after which the pin 7 is inserted through the slot 9. Preferably the thicker end 10 of the key then will be struck with a suitable tool to snugly wedge between the lugs the end portion 15 which graduates in thickness lengthwise of the key.

It is thought that the many advantages of a wear reducing key in accordance with this invention will be readily apparent, and although the preferred embodiments of the key are as illustrated and described, it is to be understood that changes in the details of construction may be resorted to, so long as such changes fall within the scope of the invention as defined in the appended claims.

What I claim is:—

1. In combination with a brake head and shoe having overlapping, apertured lugs, and a substantially flat brake pin extending through said lugs, a key inserted between an adjacent pair of said overlapping lugs, said key having an elongated slot for receiving said pin therethrough.

2. In combination with a brake head and shoe having overlapping, apertured lugs, and a substantially flat brake pin extending through said lugs, a key inserted between an adjacent pair of said overlapping lugs, said key having an elongated slot for receiving said pin therethrough, said key decreasing in thickness transversely thereof.

3. In combination with a brake head and shoe having overlapping, aperture lugs, and a substantially flat brake pin extending through said lugs, a key inserted between an adjacent pair of said overlapping lugs, said key having an elongated slot for receiving said pin therethrough, said slot being of materially greater length than the width of said pin.

4. In combination with a brake head and shoe having overlapping, apertured lugs, and a substantially flat brake pin extending through said lugs, a key inserted between an adjacent pair of said overlapping lugs, said key having an elongated slot for receiving said pin therethrough, said key being of uniform thickness in a lengthwise direction from one end of the key to a point spaced from the opposite end thereof.

5. In combination with a brake head and shoe having overlapping, apertured lugs, and a substantially flat brake pin extending through said lugs, a key inserted between an adjacent pair of said overlapping lugs, said key having an elongated slot for receiving said pin therethrough, said key gradually decreasing in thickness from one end thereof to a point spaced from the opposite end thereof.

6. In combination with a brake head and shoe having overlapping, apertured lugs, and a substantially flat brake pin extending through said lugs, a key inserted between an adjacent pair of said overlapping lugs, said key having an elongated slot for receiving said pin therethrough said key decreasing in thickness transversely thereof, said key having an end portion of uniform thickness lengthwise of the key and having its opposite end portion of decreasing thickness lengthwise of the key from one end thereof.

In testimony whereof, I affix my signature hereto.

JOHN A. WAGNER.